United States Patent
Watanabe

(10) Patent No.: US 7,121,661 B2
(45) Date of Patent: Oct. 17, 2006

(54) INK JET RECORDING METHOD EMPLOYING INKS WITH SPECIFIC SURFACE TENSIONS

(75) Inventor: Shinya Watanabe, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 300 days.

(21) Appl. No.: 10/756,078

(22) Filed: Jan. 12, 2004

(65) Prior Publication Data

US 2004/0201659 A1 Oct. 14, 2004

(30) Foreign Application Priority Data

Jan. 21, 2003 (JP) ............... 2003-012209
Jan. 21, 2003 (JP) ............... 2003-012210

(51) Int. Cl.
*B41J 2/01* (2006.01)

(52) U.S. Cl. ............ 347/102; 347/100; 347/101; 106/31.27

(58) Field of Classification Search ........... 347/100, 347/101, 102; 106/31.27; 385/143; 427/511; 428/32.26; 522/74

See application file for complete search history.

(56) References Cited

U.S. PATENT DOCUMENTS

| | | | |
|---|---|---|---|
| 4,228,438 A | 10/1980 | Vazirani | |
| 4,391,369 A | 7/1983 | Stahl et al. | |
| 4,484,949 A | 11/1984 | Potter et al. | |
| 4,978,969 A * | 12/1990 | Chieng | 347/102 |
| 6,092,890 A * | 7/2000 | Wen et al. | 347/101 |
| 6,291,704 B1 | 9/2001 | Anderson et al. | |
| 6,466,730 B1 * | 10/2002 | Nair et al. | 385/143 |
| 6,720,042 B1 * | 4/2004 | Ylitalo et al. | 428/32.26 |
| 6,726,317 B1 * | 4/2004 | Codos | 347/106 |
| 6,730,714 B1 * | 5/2004 | Ylitalo et al. | 522/74 |
| 2004/0050292 A1 * | 3/2004 | Nakajima et al. | 106/31.27 |
| 2004/0052967 A1 * | 3/2004 | Takabayashi | 427/511 |
| 2004/0201660 A1 * | 10/2004 | Nishikawa et al. | 347/100 |

FOREIGN PATENT DOCUMENTS

| | | |
|---|---|---|
| EP | 0568841 A1 | 10/1993 |
| GB | 0400780.3 | 5/2004 |
| JP | 56-093776 | 7/1981 |
| JP | 58-32674 | 2/1983 |
| JP | 05-186725 | 7/1993 |
| WO | WO 99/29788 | 6/1999 |
| WO | WO00/31189 | 6/2000 |

* cited by examiner

*Primary Examiner*—Hai Pham
*Assistant Examiner*—Carlos Martinez
(74) *Attorney, Agent, or Firm*—Lucas & Mercanti, LLP

(57) ABSTRACT

The ink jet recording method ejects an actinic radiation curable ink having a cationically polymerizable component from an ink jet recording head onto a recording media, and subsequently cures the ink by exposing it to actinic radiation. The ink in a recording media satisfy the formula (|C−B|) of 0–20 mN/m in which C is the surface tension of the recording media in mN/m and B is the surface tension of the cured ink in mN/m after exposure to the actinic radiation.

13 Claims, No Drawings

INK JET RECORDING METHOD EMPLOYING INKS WITH SPECIFIC SURFACE TENSIONS

BACKGROUND OF THE INVENTION

The present invention relates to a novel ink jet recording method employing an actinic radiation curable ink.

Heretofore, widely employed as ink jet recording ink has been aqueous liquid ink (water based ink). Further, a hot-melt type ink jet recording method is proposed in which a hot-melt type ink comprising wax as a component, which is solid at room temperature, is used and the aforesaid ink is liquefied by heating and the like, ejected by application of any appropriate form of energy, deposited onto recording media, and cooled to a solid to form recording dots.

Since the aforesaid ink is solid at room temperature, no staining occurs during handling. Further, since it is possible to minimize the evaporation amount of the aforesaid ink during melting, no clogging occurs. In addition, since the aforesaid ink is immediately solidified after deposition onto recording media, no "bleeding" occurs. As a result, the aforesaid ink exhibits advantages such that it is possible to use various types of recording media such as Japanese paper, drawing paper, postcards, or plastic sheets, without pre-treatment.

On the other hand, U.S. Pat. Nos. 4,391,369 and 4,484,949 disclose ink which results in good printing quality irrespective of paper quality. Further, Japanese Patent Publication Open to Public Inspection No. 56-93776 discloses ultraviolet radiation curable resinous ink which results in desired adhesion onto metal surface. Still further, as an ink jet recording ink which is cured by exposure to ultraviolet radiation, for example, U.S. Pat. No. 4,228,438 discloses ink which is comprised of epoxy-modified acrylic resins and urethane-modified acrylic resins as a binder, as well as pigments comprised of particles of a diameter of at most 5 microns as a coloring component. Further, Japanese Patent Publication Open to Public Inspection No. 58-32674 discloses ink in which cationically polymerizable epoxy resins are employed as a binder, while Japanese Patent Publication Open to Public Inspection No. 5-186725 discloses ink comprised of water-soluble or water-insoluble dyes which can be easily printed on plain paper as well as recycled paper.

As noted above, demanded has been emergence of an ink jet recording method which is capable of carrying out highly detailed printing resulting in photographic quality images on various media such as plastic sheets without requiring ink special jet paper sheets.

However, when the aforesaid water-soluble liquid ink is employed, it becomes difficult to carry out printing on non-ink absorptive recording media. Even though special paper sheets are employed, a relatively large ink drying apparatus is required. In addition, it is difficult to carry out highly detailed printing due to problematic bleeding and resolution is limited, whereby its overall use is currently limited.

Even when hot-melt type ink using the aforesaid wax is employed, it is possible to carry out printing on non-absorptive recording media which exhibit no ink absorbability, and in addition to carry out high speed printing. However, the aforesaid hot-melt type ink causes problems in which the resulting images hardly exhibit sufficient reliability due to very low abrasion resistance and in addition, exhibit insufficient smoothness.

On the other hand, the ink jet recording systems, which employ organic pigments as a colorant, exhibit many advantages especially in the aspect of weather resistance, compared to ink jet recording systems employing dyes. As a result, being not limited to OA equipment, general home use printers, and office printers such as facsimile machines, the aforesaid ink jet recording system is expected to be (used for application of printing outdoor posters, large signboards, and decorations of cars, glass, elevators, walls, and buildings, as well as fabrics.

Further, an ink jet recording system employing an actinic radiation curable ink, which is cured by actinic radiation such as ultraviolet radiation, makes it possible to carry out printing on non-ink absorptive recording media. However in ink jet recording systems in which ink is not substantially comprised of water and organic solvents, and the liquid ink composition is cured by actinic radiation such as ultraviolet radiation, neither disclosure nor proposals are made which results in highly detailed printing under the control of dot diameter. Further, in highly detailed printing, it is essential that the formed dot diameter is controlled to be small and the contour is clear without bleeding. Further, when printing is carried out on non-ink absorptive media employing an ink jet recording system, it is difficult to control not only the amount of ink droplets but also the dot diameter. Particularly, it is a more difficult problem to control the diameter of dots formed by small droplets.

Further, when images are formed employing a plurality of kinds of ink in the same way as color printing, it is essential that in order to carry out highly detailed printing, dot shape formed by each kind of ink is uniform.

In order to control the aforesaid dot shape, it is effective to regulate the surface tension of the ink. For example, a method (refer to Patent Document 1) is proposed which specifies surface tension of ink to 25–35 mN/m. However, only specification of surface tension of ink, as described above, is insufficient to achieve highly detailed printing. Subsequently, technical improvement is further demanded.

(Patent Document 1)

International Patent Publication Open to Public Inspection No. WO 99/29788 (claims)

SUMMARY OF THE INVENTION

From the viewpoint of the aforesaid problems, the present invention was achieved. An objective of the present invention is to provide an ink jet recording method which is capable of forming highly detailed images which exhibit excellent bleeding resistance, density uniformity, and smoothness.

The aforesaid objective of the present invention is achieved employing the following embodiments.

1. An ink jet recording method for forming an image in which ink comprising (a) ejecting an ink having an actinic radiation curable cationically polymerizable component from an ink jet recording head to deposit the ink onto a recording medium, and (b) subsequently curing the ink by exposing the ink to actinic radiation, wherein absolute value |C−B| of difference between C (mN/m) of the surface tension of a recording medium and B (mN/m) of the surface tension of ink cured by exposure to the aforesaid actinic radiation is 0–20 mN/m.

2. An ink jet recording method described in 1. above comprising further steps of:

(c) ejecting a second ink comprising an actinic radiation curable cationically polymerizable component and having a different color than a color of the ink employed in step (a); and (d) exposing the second ink on the recording medium to an actinic radiation to cure the ink, wherein absolute value (|C−B1|) of difference between C and B1 is 0–20 mN/m, wherein B1 is surface tension of at least one of the inks cured by exposing to the actinic radiation in mN/m.
3. The ink jet recording method, described in 1. or 2. above wherein surface tension of the ink does not substantially vary after exposing 50 percent of radiation energy which is required to cure the ink.
4. The ink jet recording method, described in any one of 1. through 3. above, wherein the steps (a) and (b) are repeated by employing plurality of inks each having different color, and a maximum difference in surface tension among the inks cured by exposing to the actinic radiation is at most 10 mN/m.
5. The ink jet recording method, described in 1. through 4. above, wherein the steps (a) and (b) are repeated by employing plurality of inks each having different color, and a maximum difference in surface tension among the inks before exposing is at most 10 mN/m.
6. The ink jet recording method, described in 1. through 5. above, wherein the condition of $A \leq B$ is satisfied, wherein B is a surface tension of the ink cured by exposing to the actinic radiation in mN/m, and A is surface tension in mN/m of the ink before exposing.
7. The ink jet recording method, described in one of 1. through 6. above, wherein B is 30–50 mN/m.
8. An ink jet recording method described one of 1. through 7., wherein the ink on the recording medium is exposed to an actinic radiation exhibiting the maximum illumination intensity of 0.1 to 50 mW/cm$^2$.
9. An ink jet recording method described one of 1. through 8., the recording medium is composed of a non-absorbing material.
10. An ink jet recording method described in one of 1. through 9. above wherein the recording medium is a plastic film.

DETAILED DESCRIPTION OF THE INVENTION

In order to overcome the aforesaid problems, the inventors of the present invention conducted diligent investigation. As a result, the following was discovered. In an ink jet recording method which forms an image in such a manner that ink comprising an actinic radiation curable cationically polymerizable component is ejected from an ink jet recording head and deposited onto a recording medium, and subsequently is cured by exposure to actinic radiation, it was possible to form highly detailed images which exhibited bleeding resistance, uniform density, and smoothness by satisfying the condition of $A \leq B$, wherein A in mN/m represents surface tension 1 of the aforesaid ink, while B in mN/m represents surface tension 2 of an cured ink. Thus the present invention was achieved.

Further, it was discovered that effects of the present invention were further exhibited by regulating value B of surface tension of ink cured by exposure to actinic radiation of 30–50 mN/m, by establishing conditions in which value B does not substantially vary after 50 percent of radiation energy which is required to cure an ink has been exposed, by regulating the maximum difference in value A among a plurality of inks in the ink set comprised of a plurality of at least two colored inks to at most 10 mN/m, or by regulating the maximum difference in value B among a plurality of inks to at most 10 mN/m.

The present invention will now be detailed.

Initially, an actinic radiation curable ink according to the present invention (hereinafter also referred to as an ink according to the present invention) will be detailed.

Actinic radiation curable inks include a type which comprises radically polymerizable components and a type which comprises cationically polymerizable components. When the type which comprises radically polymerizable components is exposed to actinic energy, the surface is not cured, but curing occurs in the interior. On the other hand, in the cationically polymerizable type, the surface is initially cured.

The present invention relates to a method in which images are formed on non-ink absorptive plastic media employing ink jet methods. Generally, when images are formed using ink jet methods, ink is ejected onto ink which has been previously ejected onto media and is subsequently cured. This process is repeated. Consequently, ink is required to be provided with properties suitable for ejection from ink heads, adhesion to media, adhesion to ink which has already been cured on the media, and curing by actinic radiation.

In an image forming method employing ink comprising cationically polymerizable components, it was discovered that it was critical that the surface tension of media, the surface tension of ink which had not yet cured by actinic energy and the surface tension of ink which had been cured by active energy were chosen for optimal effect.

The surface tension of ink, which is cured by actinic energy, occasionally varies as it is cured. However, no definite relationship exists between the degree of curing and the surface tension. In the ink of the present invention, it is preferable that the surface tension reaches a definite value until 50 percent of energy, which is required for complete curing, is exposed, and later, the surface tension does not vary.

The ink used in this invention contains an actinic radiation curable cationically polymerizable component, which are curable by actinic radiation.

Employed as cationically polymerizable components (which may be referred to "cationic curable monomers") may be various types of curable monomers which is cationically polymerized by actinic radiation.

Listed, for example, are epoxy compounds, vinyl ether compounds, and oxetane compounds exemplified in Japanese Patent Application Open to Public Inspection Nos. 6-9714, 2001-31892, 2001-40068, 2001-55507, 2001-310938, 2001-310937, and 2001-220526.

Examples of epoxy compounds include aromatic epoxide, alicyclic epoxide and aliphatic epoxide.

Among epoxy compounds, referable aromatic epoxy compounds are di- or poly-glycidyl ether, which is synthesized by the reaction of polyhydric phenol having at least one aromatic core or alkylene oxide-added polyhydric phenol and epichlorohydrin, and for example, di- or poly-glycidyl ether of bisphenol A or of alkylene oxide-added bisphenol A, di- or poly-glycidyl ether of hydrogenated bisphenol A or of alkylene oxide-added hydrogenated bisphenol A, and novolak type epoxy resin, are listed. Herein, as alkylene oxide, ethylene oxide and propylene oxide are listed.

As alicyclic epoxide, a cyclohexene oxide or cyclopentene oxide, which is obtained by epoxidation of the compound having cycloalkane ring such as at least one cyclohexene or cyclopentene ring by the appropriate oxidant such as hydrogen peroxide or peracid, is preferable.

As a preferable aliphatic epoxide, there is di- or poly-glycidyl ether of aliphatic polyvalent alcohol or of alkylene oxide-added aliphatic polyvalent alcohol, and as its representative example, di-glycidyl ether of alkylene glycol such as di-glycidyl ether of ethylene glycol, di-glycidyl ether of propylene glycol and glycidyl ether of 1,6-hexane diol, poly-glycidyl ether of polyvalent alcohol such as di- or tri-glycidyl ether of glycerin or of alkylene oxide added glycerin, and di-glycidyl ether of polyalkylene glycol such as di-glycidyl ether of polyethylene glycol or of alkylene oxide-added polyethylene glycol, and di-glycidyl ether of polypropylene glycol or of alkylene oxide-added polypropylene glycol, are listed. Herein, as alkylene oxide, ethylene oxide and propylene oxide are listed.

In these epoxides, when the quick hardening ability is considered, aromatic epoxide and alicyclic epoxide are preferable, and particularly, alicyclic epoxide is preferable. In the present invention, on kind of the above epoxides may be solely used, and more than two kinds of them may also be used by appropriately being combined.

Also as a vinyl ether compound preferably used in the ink of the present invention, vinyl ether compounds can be used, and for example, di or tri-vinyl ether compound, such as ethylene glycol di-vinyl ether, di-ethylene glycol di-vinyl ether, tri-ethylene glycol di-vinyl ether, propylene glycol di-vinyl ether, di-propylene glycol di-vinyl ether, butane diol di-vinyl ether, hexane diol di-vinyl ether, cyclohexane di-methanol di-vinyl ether, tri-methylol propane tri-vinyl ether, or mono vinyl ether compound, such as ethyl vinyl ether, n-butyl vinyl ether, iso-butyl vinyl ether, octadecyl vinyl ether, cyclohexyl vinyl ether, hydroxy butyl vinyl ether, 2-ethyl-hexyl vinyl ether, cyclo-hexane di-methanol mono-vinyl ether, n-propyl vinyl ether, iso-propyl vinyl ether, iso-propenyl ether-o-propylene carbonate, dodecyl vinyl ether, or di-ethylene glycol mono vinyl ether vinyl ether, is listed.

In these vinyl ether compounds, when the hardening ability, adhesion or surface hardness is considered, di or tri-vinyl ether compound is preferable, and particularly di-vinyl ether compound is preferable. In the present invention, one kind of the above vinyl ether compounds may also be used, and more than two kinds of them may also be used by being appropriately combined.

The ink of the present invention preferably contains an oxetane compound as a cationic hardenable monomer.

An oxetane compound used in the present invention is a compound having an oxetane ring in the molecule. The oxetane compounds described in JP-A 2001-220526 and JP-A 2001-310937 can be used.

It is preferable to use an oxetane compound having one oxetane ring and an oxetane compound having two or more oxetane rings in combination, in view of improvement of strength and adhesion property to a recording medium of film after hardening. When an oxetane compound having five or more oxetane rings in the molecule is used in a ink composition, the viscosity of the ink composition tends to become high. As a result, it is hard to handle the ink composition. At the same time, the glass transition temperature becomes too high to obtain sufficient adhesion property after hardening. The oxetane compound of the present invention has preferably 1 to 4 oxetane rings in the molecule.

Examples of the oxetane compounds used in the present invention are described.

As oxetane compounds having one oxetane ring are shown by the following General Formula (1).

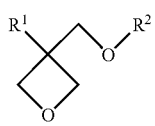

General Formula (1)

In the General Formula (1), $R^1$ is a hydrogen atom, alkyl group having 1–6 carbon atoms such methyl group, ethyl group, propyl group or butyl group, fluoro-alkyl group having 1 to 6 carbon atoms, allyl group, aryl group, furyl group, or thienyl group. $R^2$ is an alkyl group having 1 to 6 carbon atoms such as methyl group, ethyl group, propyl group or butyl group; alkenyl group having 2 to 6 carbon atoms such as 1-propenyl group, 2-propenyl group, 2-methyl-1-propenyl group, 2-methyl-2-propenyl group, 1-butenyl group, 2-butenyl group or 3-butenyl group; a group having aromatic ring such as phenyl group, benzyl group, fluoro-benzyl group, methoxy-benzyl group or phenoxy-ethyl group; alkyl carbonyl group having 2 to 6 carbon atoms such as ethyl carbonyl group, propyl carbonyl group or butyl carbonyl group; alkoxy carbonyl group having 2 to 6 carbon atoms such as ethoxy carbonyl group, propoxy carbonyl group or butoxy carbonyl group; N-alkyl carbamoyl group having 2 to 6 carbon atoms such as ethyl carbamoyl group, propyl carbamoyl group, butyl carbamoyl group or pentyl carbamoyl group. As the oxetane compound used in the present invention, it is particularly preferable that the compound having one oxetane ring is used, because the obtained composition is excellent in the coking property, and the operability is excellent in the low viscosity.

Next, as the compound having two oxetane rings, the compounds shown by the following General Formula (2) are listed.

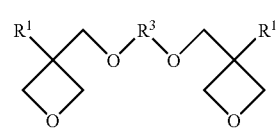

General Formula (2)

In the General Formula (2), $R^1$ is the same group as the group shown in the above-described General Formula (1). $R^3$ is, for example, a linear or branching alkylene group such as ethylene group, propylene group or butylene group; linear or branching poly (alkylene-oxy) group such as poly (ethylene oxy) group or poly (propylene oxy) group; linear or branching un-saturated hydrocarbon group such as propenylene group, methyl propenylene group or butenylene group; carbonyl group; alkylene group including carbonyl group; alkylene group including carboxyl group; alkylene group including carbamoyl group.

Further, $R^3$ may also be a polyhydric group selected from the group shown by the following General Formulas (3), (4) and (5).

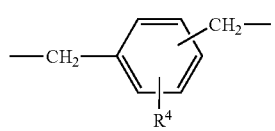

General Formula (3)

In the General Formula (3), $R^4$ is a hydrogen atom, an alkyl group having 1 to 4 carbon atoms such as methyl group, ethyl group, propyl group or butyl group, or alkoxy group having 1 to 4 carbon atoms such as methoxy group, ethoxy group, propoxy group or butoxy group, or halogen atom such as chloride atom or bromine atom, nitro group, cyano group, mercapto group, lower alkyl carboxyl group such as the group having 1 to 5 carbon atoms, carboxyl group, or carbamoyl group.

General Formula (4)

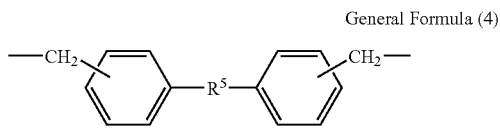

In the General Formula (4), $R^5$ is oxygen atom, sulfide atom, methylene group, —NH—, —SO—, —$SO_2$—, —$C(CF_3)_2$—, or —$C(CH_3)_2$—.

General Formula (5)

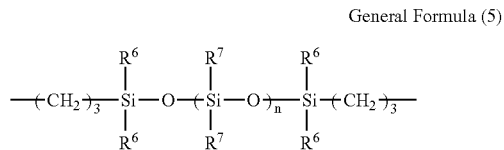

In the General Formula (5), $R^6$ is an alkyl group having 1 to 4 carbon atoms such as methyl group, ethyl group, propyl group or butyl group, or aryl group. Numeral n is an integer of 0–2000. $R^7$ is an alkyl group having 1 to 4 carbon atoms such as methyl group, ethyl group, propyl group or butyl group, or aryl group. $R^7$ is also a group selected from the group shown by the following General Formula (6).

General Formula (6)

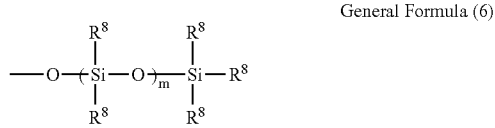

In the General Formula (6), $R^8$ is an alkyl group having 1 to 4 carbon atoms such as methyl group, ethyl group, propyl group or butyl group, or aryl group. Numeral m is an integer of 0–100.

As a specific example of the compound having two oxetane rings, the compounds shown by the following structural formulas are listed.

Exemplified compound 1

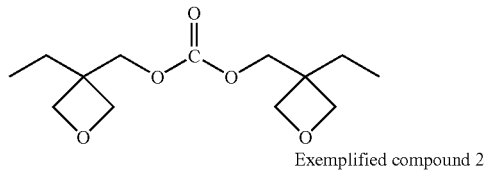

Exemplified compound 2

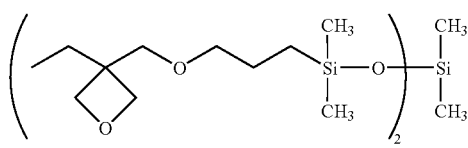

Exemplified compound 14 shown by the above structural formula is a compound in which $R^1$ is an ethyl group, and $R^3$ is a carboxy group in General Formula (2).

Exemplified compound 15 shown by the above structural formula is a compound in which each $R^6$ and $R^7$ are a methyl group, and n is 1 General Formula (5).

Among the compound having 2 oxetane rings, as a preferable example except for the above-described compounds, there are compounds shown by the following General Formula (7). In the General Formula (7), $R^1$ is the same group as in the General Formula (1).

General Formula (7)

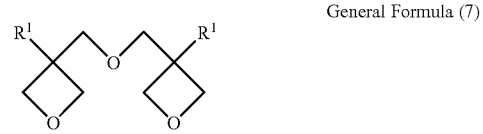

As the compounds having 3–4 oxetane rings, the compounds shown in the following General Formula (8) are listed.

General Formula (8)

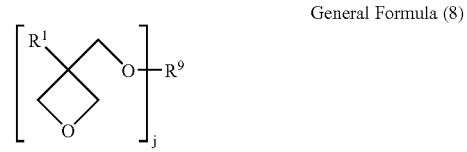

In the General Formula (8), $R^1$ is the same group as in the General formula (1). $R^9$ is, for example, branching alkylene group having 1 to 12 carbon atoms such as groups shown by the following General Formulas (9), (10), branching poly (alkylene oxy) group such as group shown by the following General Formula (11), or branching polysiloxane group such as group shown by the following General Formula (12) is listed. Numeral j is 3 or 4.

A

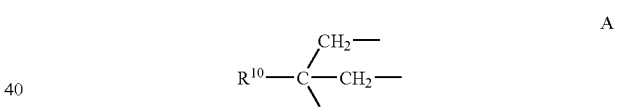

B

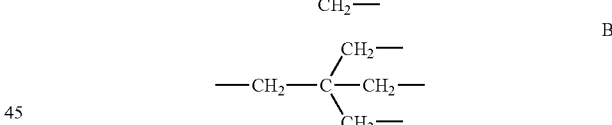

C

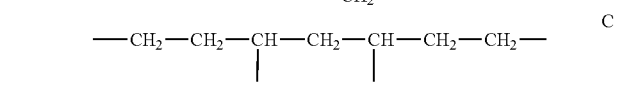

D

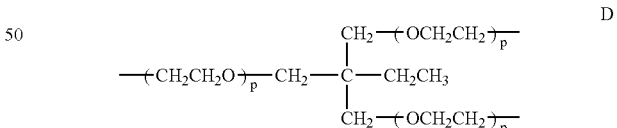

E

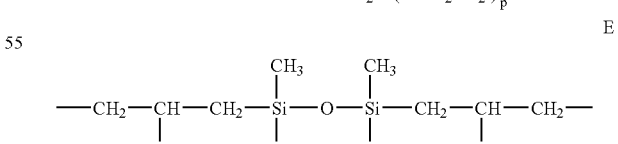

In Formula A, $R^{10}$ is a lower alkyl group such as a methyl, ethyl, or propyl group. In Formula D, p is an integer of 1 to 10.

As the specific example of the compound having 3 to 4 oxetane rings, the compound shown in the following Exemplified 3 is cited.

Exemplified compound 3

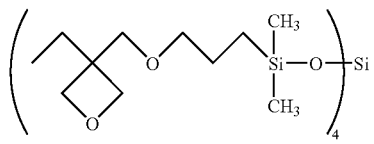

Furthermore, as an example of the compounds having 1–4 oxetane rings except the above examples, there are compounds shown in the following General Formula (9).

General Formula (9)

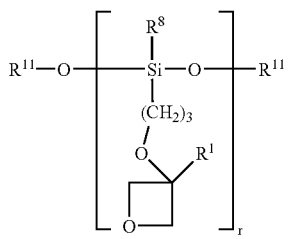

In the General Formula (9), R1 is the same group as in General Formula (1) and $R^8$ is the same group as in the General Formula (6). $R^{11}$ is alkyl group having 1 to 4 carbon atoms such as methyl group, ethyl group, propyl group or butyl group, or tri-alkyl silyl group, and numeral r is 1–4.

As preferable specific examples of the oxetane compounds used in the present invention, there are compounds shown below.

Exemplified compound 4

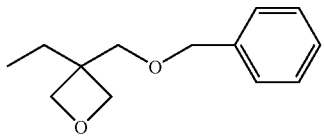

Exemplified compound 5

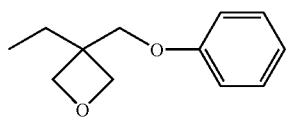

Expemplified compound 6

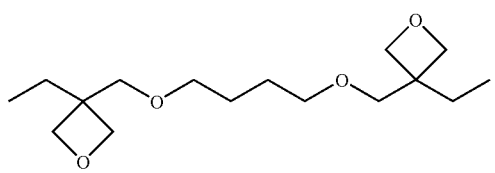

The production method of the compounds having the oxetane ring is not particularly limited, and it may be conducted according to the conventionally known method, and for example, there is a synthetic method of an oxetane ring from diol disclosed by Pattison (D. B. Pattison, J. Am. Chem. Soc., 3455, 79 (1957)).

Further, other than them, compounds having 1–4 oxetane rings, which have high molecular weight of molecular weight of about 1000–5000, are also listed. As an example of them, for example, the following compounds are listed.

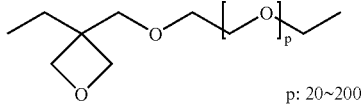

p: 20~200

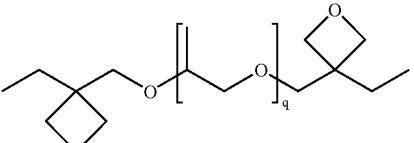

q: 15~100

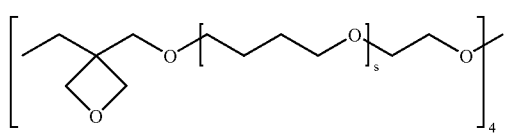

s: 20~200

As the photo initiator, all publicly known photo acid generators (a compound which generates the acid by the active ray, such as ultraviolet rays) can be used. As the photo acid generator, for example, a chemical amplification type photo resist or compound used for the light cationic polymerization is used (Organic electronics material seminar "Organic material for imaging" from Bunshin publishing house (1993), refer to page 187–192).

An initiator of cation polymerizing photo-curable resin can include an aromatic onium salt. The aromatic onium salt includes, for example, salts of elements in Va group of the periodic table for example, a phosphonium salt (such as triphenacyl phosphonium hexafluorophosphate), salts of elements in VIa group, for example, a sulfonium salts (such as triphenylsulfonium tetrafluoroborate, triphenylsulfonium hexafluorophosphate, tris(4-thiomethoxyphenyl)hexafluorophosphate, sulfonium and triphenylsulfonium hexafluoroantimonate), and salts of elements in VIIa group, for example, an iodonium salt (such as diphenyliodonium chloride). To utilize these aromatic onium salts as a cation polymerization initiator for polymerization of an epoxy compound is detailed in U.S. Pat. Nos. 4,058,401, 4,069,055, 4,101,513 and 4,161,478.

A preferable cation polymerization initiator includes sulfonium salts of elements in VIa group. Among them, triarylsulfonium hexafluoroantimonate is preferable in respect to a UV curing property and storage stability of a UV-curable composition. Further, well known photo-initiators described in "Photopolymer Handbook" (edited by Photopolymer Association, published by Kogyo Chosakai, 1989), pp. 39 to 56, and compounds described in JP-A Nos. 64-13142 and 2-4804 can be arbitrarily utilized.

Examples preferable for the present invention will be listed below.

Firstly, aromatic onium compound $B(C_6F_5)_4^-$, $PF_6^-$, $AsF_6^-$, $SbF_6^-$, $CF_3SO_3^-$ salt, such as diazonium, ammonium, iodonium, sulfonium, phosphonium, can be listed.

Specific examples of the onium compounds will be shown below.
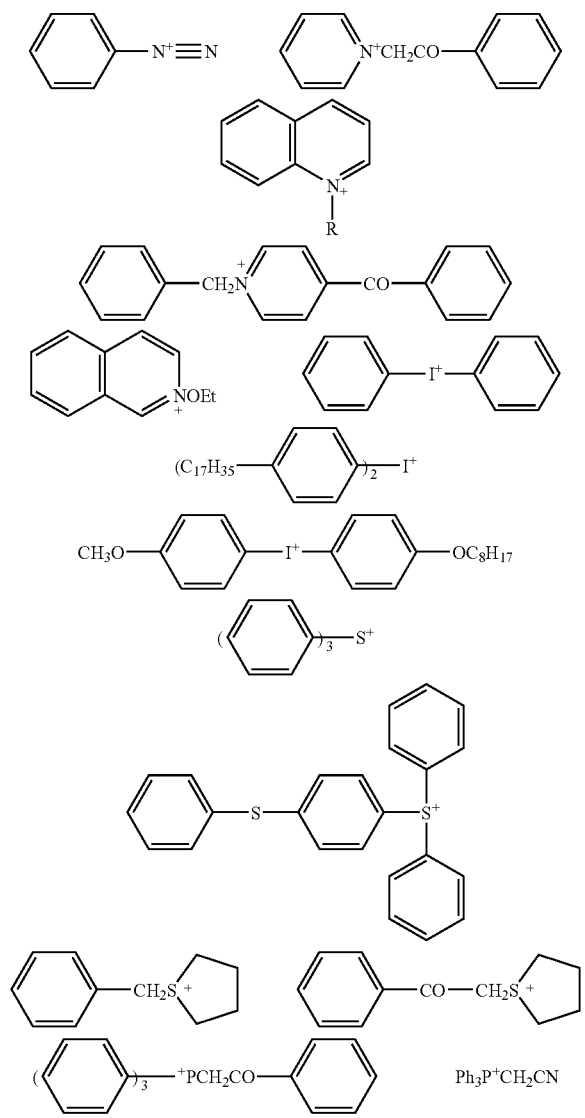
Secondly, sulfone compounds, which generate sulfonic acid, can be listed. Examples of specific compounds will be shown below.
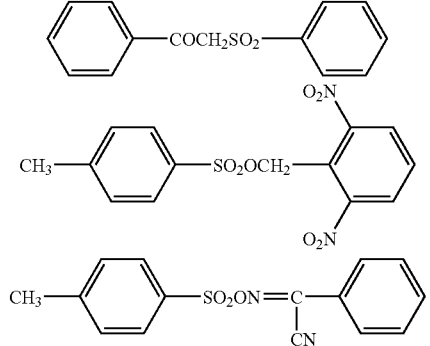
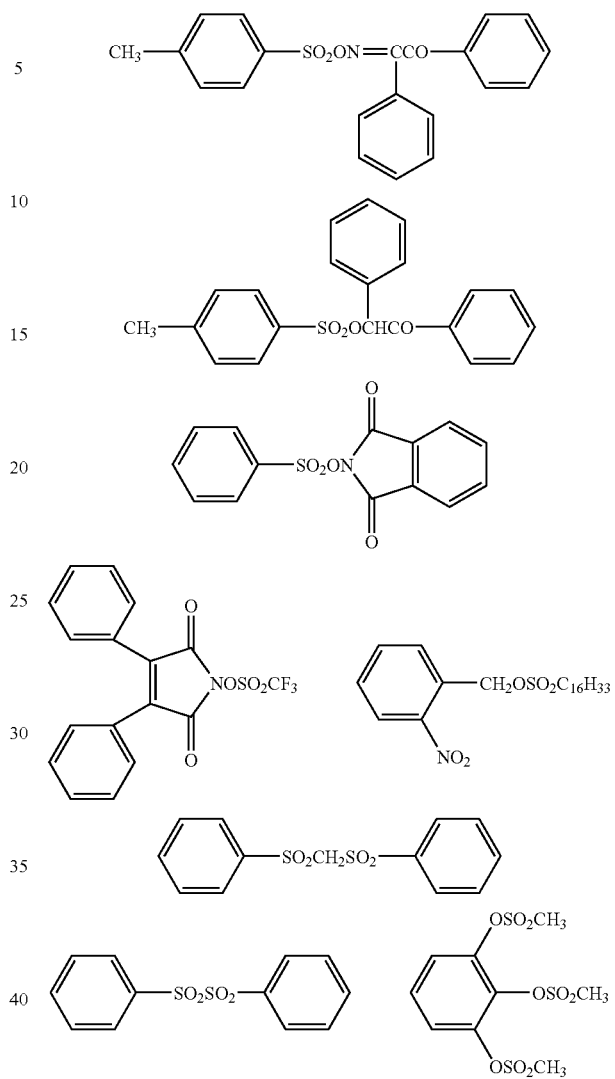
Thirdly, halogenide which generate hydrogen halide can also be used. Examples of specific compounds will be shown below.
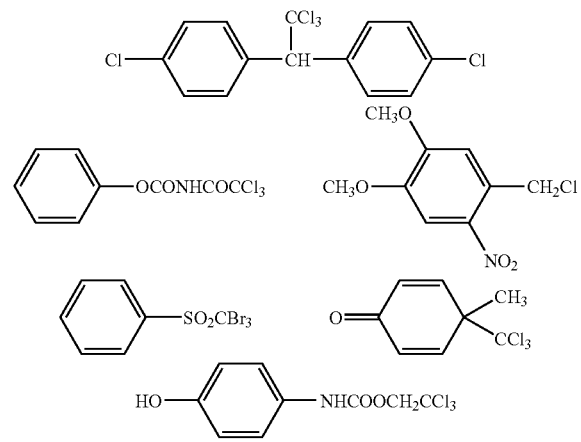

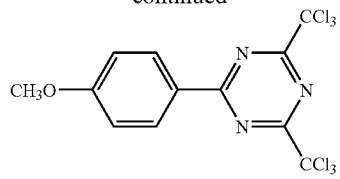

Fourthly, ferrite allene complex can be listed.

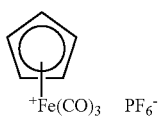  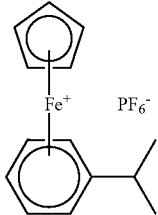

At least one of photo-acid-generation agent selected from the group consisting of an aromatic onium compound having aryl borate as a counter ion, such as diazonium, iodonium and sulfonium, and a ferrite allene complex is preferably incorporated in the ink according to the invention.

An ink according to this invention preferably contains an acid enhancing agent which generates acids by radiation of ultraviolet rays, which is readily known in the art as described in JP-A Nos. 8-248561 and 9-34106. Using an acid enhancing agent enables enhancement of more stable ejection.

In an ultraviolet curing type ink of this invention, it is preferable to contain a thermo-base generation agent to enhance ejection stability. By containing a thermo-base generation agent, it is possible, in ink-jet recording in which printed ink thickness tends to be greater compared to usual printing, to significantly reduce curling and creasing of the recording medium caused by ink shrinkage during ink hardening.

As thermo-base generation agents, preferably used are, for example, organic acids and basic salts which are decarboxylated in decomposition by heating, compounds which decompose to release amines by reactions such as intermolecular nucreophilic substitution, Lossen rearrangement or Beckmann rearrangement, and compounds causing some sort of reaction to release a base by heating. Specifically listed are salts of trichloroacetic acid described in British Patent 998,949, salts of alpha-sulfonylacetic acid described in U.S. Pat. No. 4,060,420, salts of propyl acids and derivatives of 2-carboxycarboxamide described in JP-A 59-157637, salts of thermal decomposition acids using alkaline metals and alkaline-earth metals other than organic bases as basic components described in JP-A 59-168440, hydroxamcarbamates using Lossen rearrangement described in JP-A 59-180537, and aldoxymecarbamates generating nitriles by heating described in JP-A 59-195237. In addition to these, useful are thermo base generation agents described in British Patent 998,945, U.S. Pat. No. 3,220,846, British Patent 279,480, JP-A Nos. 50-22625, 61-32844, 61-51139, 61-52638, 61-51140, 61-53634-61-53640, 61-55644, and 61-55645. Further, specifically listed are guanidine trichloroacetate, methylguanidine trichloroacetate, potassium trichloroacetate, guanidine p-methanesulfonylphenylsulfonylacetate, guanidine p-chlorophenylsulfonylacetate, guanidine p-methanesulfonylphenylsulfonylacetate, potassium phenylpropyolate, guanidine phenylpropyolate, cesium phenylpropyolate, guanidine p-chlorophenylpropyolate, guanidine p-phenylene-bis-phenylpropylate, tetramethyl ammonium phenylsulfonylacetate, and tetramethyl ammonium phenylpropyolate. The foregoing thermo-base generation agents may be employed in the wide range.

The colorants used in the present invention are those which can be solved or dispersed in a main component of the polymeric compound. However, from the viewpoint of weather fastness, the pigment is preferable.

Used as pigments which are incorporated into the ink-jet ink of the present invention may be achromatic inorganic pigments or chromatic organic pigments such as carbon black, titanium oxide, or calcium carbonate. Examples of organic pigments include insoluble azo pigments such as toluidine red, toluidine maroon, Hanza yellow, benzidine yellow, or pyrazolone red; soluble azo pigments such as litol red, helio Bordeaux, pigment scarlet, or permanent red 2B; derivatives derived from vat dyes such as alizarin, indanthrone, or thioindigo maroon; phthalocyanine based organic pigments such as phthalocyanine blue or phthalocyanine green; quinacridone based organic pigments such as quinacridone red or quinacridone magenta; perylene based organic pigments such as perylene red or perylene scarlet; isoindolinone based organic pigments such as isoindolinone yellow or isoindolinone orange; pyranthrone based organic pigments such as pyranthrone red or pyranthrone orange; thioindigo based pigments; condensed azo based organic pigments; benzimidazolone based organic pigments; quinophtharone based organic pigments such as quinophtharone yellow; isoindolin based organic pigments such as isoindolin yellow; and other pigments such as flavanthrone yellow, acylamide yellow, nickel azo yellow, copper azomethine yellow, perynone orange, anthrone orange, dianthraquinonyl red, or dioxazine violet.

Examples of organic pigments, when designated using the Color Index (C.I.) number, include C.I. Pigment Yellow 12, 13, 14, 17, 20, 24, 74, 83, 86, 93, 109, 110, 117, 125, 128, 129, 137, 138, 139, 147, 148, 150, 151, 153, 154, 155, 166, 168, 180, and 185; C.I. Pigment Orange 16, 36, 43, 51, 55, 59, and 61; C.I. Pigment Red 9, 48, 49, 52, 53, 57, 97, 122, 123, 149, 168, 177, 180, 192, 202, 206, 215, 216, 217, 220, 223, 224, 226, 227, 228, 238, and 240; C.I. Pigment Violet 19, 23, 29, 30, 37, 40, and 50; C.I. Pigment Blue 15, 15:1, 15:3, 15:4, 15:6, 22, 60, and 64; C.I. Pigment Green 7 and 36; and C.I. Pigment Brown 23, 25, and 26.

Of the aforesaid pigments, due to excellent lightfastness, preferred are quinacridone based organic pigments, phthalocyanine based organic pigments, benzimidazolone based organic pigments, isoindolinone based organic pigments, condensed azo based organic pigments, quinophtharone based organic pigments, and isoindolin based organic pigments. The aforesaid organic pigments are preferably comprised of minute pigment particles of an average diameter of 10–150 nm, which is determined utilizing laser scattering. When the average particle diameter of pigments is less than 10 nm, the resulting lightfastness is degraded due to the small particle diameter. On the other hand, when it exceeds 150 nm, the stability of the resulting dispersion is lowered whereby the pigments tend to result in precipitation.

It is possible to prepare minute-sized organic pigments, employing the method described below. Namely, a clayey mixture, consisting of at least three components of an organic pigment, a water-soluble inorganic salt in an amount of a factor of at least 3 by weight of the organic pigment, and a water-soluble solvent, is sufficiently kneaded to result in minute particles, employing a kneader and the like. Thereafter, the resulting mixture is immersed in water and stirred employing a high speed mixer to form a slurry. The resulting slurry is repeatedly filtered and washed with water, whereby water-soluble salts as well as water-soluble solvents are removed. During the minute particle production process, added may be resins as well as pigments dispersing agents. Listed as water-soluble inorganic salts are sodium chloride and potassium chloride. The weight of the employed salts is preferably in the range of 3–20 times the weight of the organic pigment. When the weight of the aforesaid inorganic salts is less than or equal to 3 times the organic pigment, it is impossible to prepare pigments of the desired particle size. On the other hand, when the weight is more or equal to 20 times the organic pigment, a major washing process is required as a post-process, whereby the process amount of the organic pigments is substantially decreased.

The aforesaid water-soluble solvents are employed so that the resulting mixture of pigments and water-soluble inorganic salts used as a crushing aid forms a suitable clayey state to result in efficient crushing. The water-soluble solvents are not particularly limited as long as they are water-soluble. However, during kneading, temperature increases, resulting in a state in which solvents tend to vaporize. As a result, from the viewpoint of safety, preferred are solvents having a boiling point of 120–250° C. Listed as such water-soluble solvents are 2-(methoxymethoxy)ethanol, 2-butoxyethanol, 2-(isopentyloxy)ethanol, 2-(hexyloxy) ethanol, diethylene glycol, diethylene glycol monomethyl ether, diethylene glycol monoethyl ether, diethylene glycol monomethyl ether, liquid polyethylene glycol, 1-methoxy-2-propanol, 1-ethoxy-2-propanol, dipropylene glycol, dipropylene glycol monomethyl ether dipropylene glycol, and low molecular weight polypropylene glycol.

In the present invention, in order to reach sufficient concentration as well as to achieve desired lightfastness, the aforesaid pigments are incorporated in the ink-jet ink in the range of 3–15 percent by weight.

Listed as pigment dispersing agents may be carboxylic acid esters containing a hydroxyl group, salts of long chain polyamides with high molecular weight acid esters, high molecular weight polycarboxylic acid salts, salts of long chain polyaminoamides with polar acid esters, high molecular weight unsaturated acid esters, high molecular copolymers, modified polyurethanes, modified polyacrylates, polyether ester type anion based surface active agents, naphthalenesulfonic acid formalin condensation product salts, aromatic sulfonic acid formalin condensation product salts, polyoxyethylene alkylphosphoric acid esters, polyoxyethylene nonyl phenyl ether, stearylamine acetate, and pigment derivatives.

Specific examples of pigment dispersing agents include "ANTI-TERRA-U (a polyaminoamide phosphoric acid salt) ", "ANTI-TERRA-203/204 (a high molecular weight epoxy-carboxylic acid salt)". DISPERBYK-101 (polyaminoamide phosphoric acid salt and acid ester), 107 (a hydroxyl group containing carboxylic acid ester), 110 (an acid group containing copolymer), 130 (polyamide), 161, 162, 163, 164, 165, 166, and 170 (high molecular copolymer)", "400", "BYKUMEN" (a high molecular weight unsaturated acid ester), "BYK-P104, P105, (high molecular weight unsaturated polycarboxylic acid)" "P104S, 240S (high molecular weight unsaturated acid polycarboxylic acid and silicon based), and "LACTIMON (long chain amine, unsaturated acid polycarboxylic acid, and silicon)", manufactured by BYK Chemie Co.

Further, listed of dispersants are "EFKA 44, 46, 47, 48, 49, 54, 63, 64, 65, 66, 71, 701, 764, and 766". "EFKA POLYMER 100 (modified polyacrylate), 150 (an aliphatic modified polymer), 400, 401, 402, 403, 450, 451, and 453 (modified polyacrylates), 745 (being copper phthalocyanine based)", manufactured by Efka Chemicals Co., and "FLOWLEN TG-710 (urethane oligomer)", "FLOWNON SH-290, SP-1000", "POLYFLOW No. 50E, and No. 300 (an acryl based copolymer)", manufactured by Kyoei Kagaku Co., "DISPARLON KS-860, 873SN, and 874 (a polymer dispersing agent), #2150 (aliphatic multivalent carboxylic acid), and #7004 (polyether ester type)", manufactured by Kusumoto Kasei Co.

Further, listed of dispersants are "DEMOL RN and N (both are naphthelenesulfonic acid formalin condensation product sodium salts), MS, C, and SN-B (all are aromatic sulfonic acid formalin condensation product sodium salts), and EP", "HOMOGENOL L-18 (a polycarboxylic acid type polymer)", "EMULGEN 920, 930, 931, 935, 950, and 985 (all are polyoxyethylene nonyl phenyl ethers)", and "ACETAMIN 24 (coconut amine acetate) and 86 (stearylamine acetate)", manufactured by Kao Corp., "SOLSPERSE 5000 (phthalocyanine ammonium salt based), 13240 and 13940 (both are polyesteramine based), 17000 (being fatty acid amine based), 24000, and 2000", manufactured by Zeneca Corp., and "NIKKOL T106 (polyoxyethylene sorbitan monooleate), MYS-IEX (polyoxyethylene monostearate), and HEXAGLINE 4-0 (hexaglyceryl tetraoleate)", manufactured by Nikko Chemical Co.

The aforesaid pigment dispersing agents are preferably incorporated in an amount ranging from 0.1 to 10 percent by weight in the ink.

The ink-jet ink of the present invention is produced by dispersing pigments together with actinic radiation curable compounds and pigment dispersing agents, employing a common homogenizer such as a sand mill. It is preferable that a concentrated liquid pigment composition at a high concentration, which has previously been prepared, is diluted by actinic radiation curable compounds. It is possible to achieve sufficient dispersion even though dispersion is carried out employing a common homogenizer. Due to that, excessive dispersion energy as well as excessive dispersion time is not needed. As a result, ink components are not easily modified during dispersion, whereby it is possible to prepare an ink which exhibits excellent stability. The ink is preferably filtered employing a filter having a pore size of at most 3 μm and further at most 1 μm.

A various additives can be used in the ink beside the above-described materials. Examples of the additives are: surface active agents, leveling additive agents, mat agents, polyester resins for adjusting the film property, polyurethane resins, vinyl resins, acrylic resins, rubber resins, or wax. In order to improve the adhesion to the recording medium, it is also effective that the very fine amount of organic solvent is added. In this case, the addition within the range that the problem of the solvent resistance or VOC is not generated, is effective, and the amount is 0.1–5 weight %, preferably 0.1–3 weight % of the total ink weight.

The ink according to the present invention is preferably to satisfy that absolute value (|C−B|) of difference between value C (mN/m) of the surface tension of a recording medium and value B (mN/m) of the surface tension of ink cured by exposure to the aforesaid actinic radiation is 0–20 mN/m. The aforesaid absolute value is more preferably 0–10 mN/m. When absolute value (|C−B|) of difference between surface tension value C and surface tension value B exceeds 20 mN/m, smoothness of formed images is degraded and non-uniform density results. As a result, it becomes extremely difficult to prepare highly detailed images.

Further, in the ink according to the present invention, it is preferable that the surface tension of ink does not substantially vary after exposure of 50 percent of energy, which is required to cure ink, has been exposed. In the case in which an image is formed by further ejecting ink on the image which has been formed by ejecting ink onto a recording medium and cured, when recording speed is increased, a case occurs in which subsequent ink is deposited onto ink which has not completely cured. In such a case, when surface tension of the ink markedly varies depending on exposure energy, ink is deposited onto the image surface having various values of surface tension. As a result, dot shape fluctuates to result in non-uniform images, whereby highly detailed images tend not to be formed.

"Surface tension of the ink does not substantially varies", means that difference of surface tension of the completely cured ink is within 5 dyn/cm.

Further, in the ink according to the present invention, when images are formed employing an ink set comprised of a plurality of inks, it is preferable that the maximum difference in surface tension among the inks is at most 10 mN/m. When the aforesaid maximum value exceeds 10 mN/m, dot shapes formed by each ink fluctuate, resulting in formation of non-uniform images. As a result, highly detailed images tend not to be formed.

In the ink according to the present invention constituted as above, the present invention is characterized in that the condition of $A \leq B$ is satisfied, wherein A in mN/m represents surface tension of the aforesaid ink before exposure to radiation, while B in mN/m represents surface tension of the cured ink. When the relationship between A and B is represented by A>B, cases occur in which smoothness of formed image is degraded or density is not uniform. As a result, it becomes extremely difficult to form highly detailed images.

Further, in the ink according to the present invention, B is preferably 30–50 mN/m. When B is less than 30 mN/m, smoothness of images is degraded, whereby highly detailed images tend not to be formed. On the contrary, when B exceeds 50 mN/m, bleeding of ink deposited onto recording media increases, whereby highly detailed images also tend not to be formed.

Further, in the ink according to the present invention, when images are formed employing an ink set comprised of a plurality of inks, it is preferable that the maximum difference in surface tension A among inks before exposure, or the maximum difference in surface tension B after exposure among the inks is at most 10 mN/m. When the aforesaid maximum value exceeds 10 mN/m, dot shapes formed by each ink fluctuate, resulting in formation of non-uniform images. As a result, highly detailed images tend not to be formed.

It is possible to obtain the value of surface tension of inks specified in the present invention, as a value (in mN/m) of static surface tension at 25° C., employing a platinum plate method while using a surface tensiometer (for example, CBVP-Z, manufactured by Kyowa Interface Science Co., Ltd.). Further, it is possible to obtain the surface tension value of ink cured by exposure to actinic radiation as a value (in mN/m) of solid surface tension in the following manner. After curing, the contact angle of water, methylene iodide, and nitromethane on the surface of ink images is determined. Thereafter, calculation is carried out according to the calculation formula described in Nihon Setchaku Gakkai Shi (Journal of The Adhesion Society of Japan), Volume 8, page 131 (1972).

The method to control the surface tension of the hardened ink satisfying the condition according to the invention is not particularly restricted, and it is realized by selecting the species of surface active agents and their amount, and the species of pigment dispersant, polymerizable component or polymerization initiator and their amount adequately.

Surface active agents which are used as one of control means of each of the aforesaid surface tension will now be described.

The surface active agents usable in the present invention are not particularly limited. Examples include anionic surface active agents such as dialkyl sulfosuccinates, alkyl-naphthalenesulfonates, or fatty acid salts; nonionic surface active agents such as polyoxyethylene alkyl ethers, polyoxyethylene alkyl allyl ethers, acetylene glycols, polyoxyethylene-polyoxypropylene block copolymers, or phosphoric acid esters; cationic surface active agents such as alkylamines or quaternary ammonium salts; and fluorine surface active agents. Of these, anionic surface active agents as well as nonionic surface active agents are particularly preferred.

In the ink jet recording method of the present invention, ink is ejected onto recording media employing an ink jet recording system to form images, and the resulting ink is cured by exposure to actinic radiation.

Ink ejection conditions are such that a recording head and ink are heated to 35–100° C. and ejection is performed to achieve ejection stability. The viscosity of an actinic radiation curable ink varies widely depending on the variation of temperature. The resulting viscosity variation results in major effects to the liquid droplet size as well as the liquid droplet ejection rate to degrade image quality. As a result, it is necessary to maintain the raised temperature at a constant value. The controlled temperature range of ink temperature is preferably set temperature ±5° C., more preferably set temperature ±2° C., and still more preferably set temperature ±1° C.

Further, in the present invention, the volume of a liquid droplet ejected from each nozzle is preferably 2–15 pl.

In the image forming method of the present invention, actinic radiation is preferably exposed 0.001–2.0 seconds after ink impingement and more preferably 0.001–1.0 second. In order to form highly detailed images, it is particularly critical that exposure timing is started as soon as possible.

A basic method for actinic radiation exposure is disclosed in Japanese Patent Application Open to Public Inspection No. 60-132767. According to the aforesaid patent, light sources are arranged on both sides of a head unit and aforesaid head and light sources are subjected to scanning, employing a shuttle system. Exposure is to be carried out a definite time after ink impingement. Further, curing is completed employing another light source which is not driven. U.S. Pat. No. 6,145,979 discloses exposure methods in which optical fibers are employed and UV radiation is exposed to a recording section while collimated UV radiation is incident to a mirror surface provided on the head unit side surface. In the image forming method of the present invention, any of these exposure methods may be employed.

Further, a preferred embodiment includes a method in which 2-step actinic radiation exposure is carried out in such a manner that first actinic radiation is exposed 0.001–2.0 seconds after ink impingement and after completing printing, actinic radiation is further exposed. By achieving the aforesaid 2-step actinic radiation exposure, it becomes possible to minimize contraction of recording materials which occurs during ink curing.

In the present invention, it is preferable to use actinic radiation exhibiting the maximum illumination intensity of 0.1 to 50 mW/cm² in the effective wavelength range for hardening ink. Heretofore, in the UV ink-jet system, in order to minimize dot spread and bleeding after ink impingement, commonly employed are high illumination intensity light sources which consume 50 mW/cm². However, currently, it is practically impossible to use such light sources due to excessively large contraction of recording materials, especially in shrink label printing.

Examples of source of actinic ray irradiation include a low pressure mercury lamp, a UV laser, a xenon flash lamp, a black light, a light trap lamp, a cold cathode tube, and an LED, to which the examples are not restricted.

Further, in the invention, light having a maximum illuminance in a wavelength range effective for curing of from 50 to 3000 mW/cm² is also effective. Although it is a high illuminance light source conventionally well known to be utilized for UV curable type ink jet recording, UV curable type ink jet recording has not been practically utilized in the field of light package printing and label printing due to a shrinkage problem of a recording material as described above. In a constitution of the invention, the problem has been solved, and high resolution image formation on various kinds of plastic films has come to be possible even with a conventional high illuminance light source. Examples of such light sources include a high-pressure mercury lamp, a metal halide lamp and a non-electrode UV lamp, however, the invention is not limited thereto.

As a recording material having a non-absorbing property according to the invention, various plastics and films thereof having a non-absorbing property, which are used in a so-called light packaging in addition to ordinary non-coated paper and coated paper can be utilized, and various plastic films include, for example, a PET film, an OPS film, an OPP film, an ONy film, a PVC film, a PE film and a TAC film. As plastic films other than these, polycarbonate, acryl resin, ABS, polyacetal, PVA and a rubber series can be utilized. A metal series and a glass series are also applicable. Among these recording materials, a constitution of the invention is effective especially in case of forming an image on a PET film, an OPS film, an OPP film, an ONy film and a PVC film, which are capable of thermal shrinking. These base materials are liable to cause curl and deformation of a film due to such as curing shrinkage or heat accompanied with curing reaction of ink, and, in addition, an ink layer is hard to follow shrinkage of a base material.

Surface energies of the various kinds of plastic films greatly differ from one another, and, heretofore, there has been a problem in that a dot diameter after an ink bullet landing varies depending on recording materials. In the present invention, it is possible to form an excellent high resolution image on a wide range of recording materials such as having a surface tension of from 35 to 60 mN/m.

In the invention, a long length roll (web) of a recording material is advantageously utilized in respect to a cost of a recording material such as a packaging cost and a manufacturing cost, an efficiency of print preparation and applicability to variety of sizes.

EXAMPLES

The present invention will now be detailed with reference to examples.

<<Preparation of Pigment Dispersion>>

Each of the compositions described below was dispersed for one hour employing a sand mill and subsequently filtered, whereby each pigment dispersion was prepared.

| (Preparation of Black Pigment Dispersion) | |
|---|---|
| Carbon black | 10 weight parts |
| Cationically polymerizable compound (OXT221, oxetane compound, manufactured by TOAGOSEI Co., Ltd.) | 88 weight parts |
| Pigment dispersing agent (Ajisper PB822, manufactured by Ajinomoto-Fine-Techno Co., Inc.) | 2 weight parts |
| (Preparation of Yellow Pigment Dispersion) | |
| C.I. Pigment Yellow 180 | 10 weight parts |
| Cationically polymerizable compound (OXT221, listed above) | 88 weight parts |
| Pigment dispersing agent (Ajisper PB822, listed above) | 2 weight parts |
| (Preparation of Magenta Pigment Dispersion) | |
| C.I. Pigment Red 146 | 10 weight parts |
| Cationically polymerizable compound (OXT221, listed above) | 88 weight parts |
| Pigment dispersing agent (Ajisper PB822, listed above) | 2 weight parts |
| (Preparation of Cyan Pigment Dispersion) | |
| C.I. Pigment Blue 15:3 | 10 weight parts |
| Cationically polymerizable compound (OXT221, listed above) | 88 weight parts |
| Pigment dispersing agent (Ajisper PB822, listed above) | 2 weight parts |

<<Preparation of Ink>>

By employing each pigment dispersion prepared as above, each ink was prepared based on the compositions described in Tables 1–4.

Each of the colored inks was prepared in the following manner. All additives except for the pigment dispersion, described in each table, were added. After assuring that all additives were completely dissolved, the resulting solution was heated to 50° C. and each of the aforesaid pigment dispersion was gradually added. Subsequently, the resulting mixture was sufficiently stirred and pre-filtered employing a 10 μm filter as pre-filtration. During the aforesaid filtering process, a desired filtration rate was achieved without generation of pressure loss.

Subsequently, while stirring, the resulting ink was heated to 50° C. and air as well as moisture dissolved in the ink were removed under vacuum, whereby each ink was prepared.

<<Determination of Ink Characteristics>>

(Determination of Surface Tension 1 (Value A))

The value (in mN/m) of static surface tension of each ink composition, prepared as above, was determined at 25° C., employing a platinum plate method, while using a surface tensiometer (CBVP-Z, manufactured by Kyowa Interface Science Co., Ltd.).

(Determination of Surface Tension 2 (Value B) of Cured Ink Jet Images)

The solid surface tension of cured ink jet images, specified in the present invention, was determined employing the method described below.

The contact angle of water, methylene iodide, and nitromethane on the cured ink jet images formed employing the ink jet recording method described below was determined. Thereafter, calculation was carried out based on the calculation formula described in Nihon Setchaku Gakkai Shi (Journal of The Adhesion Society of Japan), Volume 8, page 131 (1972), whereby the solid surface tension (in mN/m) of the ink jet images was obtained.

(Determination of Surface Tension (*1) of Ink Jet Images When 50 Percent of Radiation Energy Which is Required to Cure an Ink has Been Exposed)

After forming ink jet images employing the method described below, when 50 percent of exposure energy required for curing, so that the resulting image can not be removed by rubbing with fingers is exposed, the surface tension of ink images was determined employing the same method as above.

Tables 1–4 also show the value of each surface tension determined as above.

TABLE 1

| | Ink Composition (weight percent) | | | | | | | | Ink Surface Tension (mN/m) | | |
|---|---|---|---|---|---|---|---|---|---|---|---|
| Yellow | Yellow Pigment | Oxetane Compound | Epoxy Compound | | Polymerization Initiator | Surfactant | | | | | |
| Ink No. | Dispersion | OXT221 | Compound | Amount | INI | Surfactant | Amount | Value A | Value B | *1 |
| Y-1 | 25.0 | 44.0 | 2021P | 28.0 | 3.0 | F178K | 0.01 | 20 | 15 | — |
| Y-2 | 25.0 | 63.0 | 2021P | 9.0 | 3.0 | — | 0 | 20 | 30 | — |
| Y-3 | 25.0 | 44.0 | 2021P | 28.0 | 3.0 | — | 0 | 30 | 40 | 40 |
| Y-4 | 25.0 | 25.0 | 2021P | 47.0 | 3.0 | — | 0 | 40 | 50 | — |
| Y-5 | 25.0 | 45.0 | 2021P | 28.0 | 2.0 | — | 0 | 30 | 40 | 33 |
| Y-6 | 25.0 | 44.0 | 3000 | 28.0 | 3.0 | — | 0 | 60 | 55 | — |
| Y-7 | 25.0 | 62.0 | 3000 | 9.0 | 3.0 | ED152 | 1.00 | 20 | 30 | — |
| Y-8 | 25.0 | 43.0 | 3000 | 28.0 | 3.0 | ED152 | 1.00 | 30 | 40 | 40 |
| Y-9 | 25.0 | 24.0 | 3000 | 47.0 | 3.0 | ED152 | 1.00 | 40 | 50 | — |
| Y-10 | 25.0 | 44.0 | 3000 | 28.0 | 2.0 | ED152 | 1.00 | 30 | 40 | 33 |

*1: Surface tension of ink jet images when 50 percent of exposure energy required for curing has been exposed

TABLE 2

| | Ink Composition (weight percent) | | | | | | | | Ink Surface Tension (mN/m) | | |
|---|---|---|---|---|---|---|---|---|---|---|---|
| Magenta | Magenta Pigment | Oxetane Compound | Epoxy Compound | | Polymerization Initiator | Surfactant | | | | | |
| Ink No. | Dispersion | OXT221 | Compound | Amount | INI | Surfactant | Amount | Value A | Value B | *1 |
| M-1 | 25.0 | 44.0 | 2021P | 28.0 | 3.0 | F178K | 0.01 | 20 | 15 | — |
| M-2 | 25.0 | 63.0 | 2021P | 9.0 | 3.0 | — | 0 | 20 | 30 | — |
| M-3 | 25.0 | 44.0 | 2021P | 28.0 | 3.0 | — | 0 | 30 | 40 | 40 |
| M-4 | 25.0 | 25.0 | 2021P | 47.0 | 3.0 | — | 0 | 40 | 50 | — |
| M-5 | 25.0 | 45.0 | 2021P | 28.0 | 2.0 | — | 0 | 30 | 40 | 33 |
| M-6 | 25.0 | 44.0 | 3000 | 28.0 | 3.0 | — | 0 | 60 | 55 | — |
| M-7 | 25.0 | 62.0 | 3000 | 9.0 | 3.0 | ED152 | 1.00 | 20 | 30 | — |
| M-8 | 25.0 | 43.0 | 3000 | 28.0 | 3.0 | ED152 | 1.00 | 30 | 40 | 40 |
| M-9 | 25.0 | 24.0 | 3000 | 47.0 | 3.0 | ED152 | 1.00 | 40 | 50 | — |
| M-10 | 25.0 | 44.0 | 3000 | 28.0 | 2.0 | ED152 | 1.00 | 30 | 40 | 33 |

TABLE 3

| | Ink Composition (weight percent) | | | | | | | | Ink Surface Tension (mN/m) | | |
|---|---|---|---|---|---|---|---|---|---|---|---|
| Cyan Ink | Cyan Pigment | Oxetane Compound | Epoxy Compound | | Polymerization Initiator | Surfactant | | | | | |
| No. | Dispersion | OXT221 | Compound | Amount | INI | Surfactant | Amount | Value A | Value B | *1 |
| C-1 | 25.0 | 44.0 | 2021P | 28.0 | 3.0 | F178K | 0.01 | 20 | 15 | — |
| C-2 | 25.0 | 63.0 | 2021P | 9.0 | 3.0 | — | 0 | 20 | 30 | — |
| C-3 | 25.0 | 44.0 | 2021P | 28.0 | 3.0 | — | 0 | 30 | 40 | 40 |
| C-4 | 25.0 | 25.0 | 2021P | 47.0 | 3.0 | — | 0 | 40 | 50 | — |
| C-5 | 25.0 | 45.0 | 2021P | 28.0 | 2.0 | — | 0 | 30 | 40 | 33 |
| C-6 | 25.0 | 44.0 | 3000 | 28.0 | 3.0 | — | 0 | 60 | 55 | — |
| C-7 | 25.0 | 62.0 | 3000 | 9.0 | 3.0 | ED152 | 1.00 | 20 | 30 | — |

TABLE 3-continued

| | | | Ink Composition (weight percent) | | | | | | | |
|---|---|---|---|---|---|---|---|---|---|---|
| Cyan Ink | Cyan Pigment | Oxetane Compound | Epoxy Compound | | Polymerization Initiator | Surfactant | | Ink Surface Tension (mN/m) | | |
| No. | Dispersion | OXT221 | Compound | Amount | INI | Surfactant | Amount | Value A | Value B | *1 |
| C-8 | 25.0 | 43.0 | 3000 | 28.0 | 3.0 | ED152 | 1.00 | 30 | 40 | 40 |
| C-9 | 25.0 | 24.0 | 3000 | 47.0 | 3.0 | ED152 | 1.00 | 40 | 50 | — |
| C-10 | 25.0 | 44.0 | 3000 | 28.0 | 2.0 | ED152 | 1.00 | 30 | 40 | 33 |

TABLE 4

| | | | Ink Composition (weight percent) | | | | | | | |
|---|---|---|---|---|---|---|---|---|---|---|
| Black Ink | Black Pigment | Oxetane Compound | Epoxy Compound | | Polymerization Initiator | Surfactant | | Ink Surface Tension (mN/m) | | |
| No. | Dispersion | OXT221 | Compound | Amount | INI | Surfactant | Amount | Value A | Value B | *1 |
| K-1 | 25.0 | 44.0 | 2021P | 28.0 | 3.0 | F178K | 0.01 | 20 | 15 | — |
| K-2 | 25.0 | 63.0 | 2021P | 9.0 | 3.0 | — | 0 | 20 | 30 | — |
| K-3 | 25.0 | 44.0 | 2021P | 28.0 | 3.0 | — | 0 | 30 | 40 | 40 |
| K-4 | 25.0 | 25.0 | 2021P | 47.0 | 3.0 | — | 0 | 40 | 50 | — |
| K-5 | 25.0 | 45.0 | 2021P | 28.0 | 2.0 | — | 0 | 30 | 40 | 33 |
| K-6 | 25.0 | 44.0 | 3000 | 28.0 | 3.0 | — | 0 | 60 | 55 | — |
| K-7 | 25.0 | 62.0 | 3000 | 9.0 | 3.0 | ED152 | 1.00 | 20 | 30 | — |
| K-8 | 25.0 | 43.0 | 3000 | 28.0 | 3.0 | ED152 | 1.00 | 30 | 40 | 40 |
| K-9 | 25.0 | 24.0 | 3000 | 47.0 | 3.0 | ED152 | 1.00 | 40 | 50 | — |
| K-10 | 25.0 | 44.0 | 3000 | 28.0 | 2.0 | ED152 | 1.00 | 30 | 40 | 33 |

Each additive and abbreviations described in Tables 1–4 are detailed below.

OXT221: cationically polymerizable compound (previously listed)

2021P: cationically polymerixable compound (Celoxide 2021P, epoxy compound, manufactured by Dicel Chemical Industries, Ltd.

3000: cationically polymerixable compound (Celoxide 3000, epoxy compound, manufactured by Dicel Chemical Industries, Ltd.

INI: cationic photopolymerization initiator (triphenylsulfoniumhexafluorophosphoric acid salt)

F178K: fluorine surface active agent (Megafac F178K, manufactured by Dainippon Ink and Chemicals, Inc.)

ED152: phosphoric acid ester surface active agent (PLAAD ED152, manufactured by Kusumoto chemicals Co., Ltd.)

*1: surface tension of ink jet images when 50 percent of exposure energy required for curing has been exposed <<Output of Ink Jet Images>>

Subsequently, images were recorded on recording media (polyethylene terephthalate film), employing an ink jet recording apparatus comprising a piezo type ink jet nozzle comprised of 128 23 μm diameter nozzles.

An employed ink supply system comprised of an ink tank, a supply pipe, a pre-chamber ink tank just prior to the head, piping fitted with filters, and a piezo head, and the portion beteen the pre-chamber and the head section was insulated from heat, or heated. Thermal sensors were installed in the pre-chamber and near the nozzles of the piezo head and temperature of the nozzle section was maintained at 60±2° C. The size of liquid droplets was set at approximately 7 pl and ejection was controlled to achieve a resolution of 720×720 dpi (herein, dpi refers to the number of dots per inch or 2.54 cm), while driven at a driving frequency of 10 kHz.

Images were formed employing a full 4-color printer in which four color heads of Y, M, C, and K were mounted on a piezo carriage under the combinations described in Table 5. Cold-cathode tubes (special order products from Hibeck Co.) of a wavelength of 308 nm were arranged on both sides of the carriage, and ultraviolet radiation was exposed within 1,000 ms after ink deposition while scanning the head. The illumination intensity on the exposed surface was set at 15 mW/cm$^2$. Further, exposure energy was control by varying the head carriage speed and regulated so that the entire ink was exposed.

<<Evaluation of Ink Jet Images>>

Each of full color images outputted by the aforesaid ink jet printer was subjected to evaluation described below.

(Evaluation of Bleeding Resistance)

Colored dots adjacent to each other were magnified with a hand lens and a degree of bleeding was visually observed. Subsequently, bleeding resistance was evaluated based on the criteria below.

A: the shape of dots adjacent to each other remained circular and no bleeding was noticed B: the shape of dots adjacent to each other remained nearly circular and bleeding was hardly noticed C: dots adjacent to each other exhibited slight bleeding and the shape of dots was slightly deformed, which was at the lower limit of commercial viability D: dots adjacent to each other exhibited bleeding and mixing, resulting in no commercial viability (Evaluation of Image Density Non-uniformity Resistance)

Black solid images were outputted employing the aforesaid ink jet recording apparatus and subsequently exposed to ultraviolet radiation. Thereafter, non-uniformity of density was visually observed and evaluated based on the criteria below.

A: good without non-uniform density
B: slight non-uniformity density was noticed but no problems occurred for highly detailed printing
C: non-uniform density was clearly noticed, but printing was at the lower limit for commercial viability
D: non-uniform density was clearly noticed and was at the level of non-commercial viability (Evaluation of Smoothness)

A: the image layer was thin, resulting in excellent image quality
B: the layer was slightly thicker, but still resulting in highly detailed print images without non-uniformity
C: the image layer was thick and non-uniformity was noticed somewhat but was in the commercially viable range
D: the image layer was thick and image non-uniformity was clearly noticed, such that the quality resulted in problems for commercial viability

TABLE 5

| Ink set No. | Recording medium | Ink Set Composition | | | | Maximum Value of Difference in Surface Tension among inks (mN/m) | | Result of Each Evaluation | | | Remarks |
|---|---|---|---|---|---|---|---|---|---|---|---|
| | | Y Ink | M Ink | C Ink | K Ink | Value A | Value B | Bleeding Resistance | Image Density Non-Uniformity Resistance | Smoothness | |
| 1 | OPP Film | Y1 | M1 | C1 | K1 | 0 | 0 | B | D | D | Comp. |
| 2 | having | Y2 | M2 | C2 | K2 | 0 | 0 | B | A | A | Inv. |
| 3 | surface | Y3 | M3 | C3 | K3 | 0 | 0 | A | A | A | Inv. |
| 4 | tension | Y4 | M4 | C4 | K4 | 0 | 0 | A | A | A | Inv. |
| 5 | value C | Y5 | M5 | C5 | K5 | 0 | 0 | A | B | A | Inv. |
| 6 | of 47 mN/m | Y5 | M3 | C3 | K3 | 0 | 0 | A | B | A | Inv. |
| 7 | | Y3 | M5 | C3 | K3 | 0 | 0 | A | B | A | Inv. |
| 8 | | Y3 | M3 | C5 | K3 | 0 | 0 | A | B | A | Inv. |
| 9 | | Y3 | M3 | C3 | K5 | 0 | 0 | A | B | A | Inv. |
| 10 | | Y4 | M3 | C3 | K3 | 10 | 10 | A | A | A | Inv. |
| 11 | | Y3 | M4 | C3 | K3 | 10 | 10 | A | A | A | Inv. |
| 12 | | Y3 | M3 | C4 | K3 | 10 | 10 | A | A | A | Inv. |
| 13 | | Y3 | M3 | C3 | K4 | 10 | 10 | A | A | A | Inv. |
| 14 | | Y2 | M4 | C4 | K4 | 20 | 20 | B | B | A | Inv. |
| 15 | | Y4 | M2 | C4 | K4 | 20 | 20 | B | B | A | Inv. |
| 16 | | Y4 | M4 | C2 | K4 | 20 | 20 | B | B | A | Inv. |
| 17 | | Y4 | M4 | C4 | K2 | 20 | 20 | B | B | A | Inv. |
| 18 | | Y4 | M2 | C2 | K2 | 20 | 20 | B | B | A | Inv. |
| 19 | | Y2 | M4 | C2 | K2 | 20 | 20 | B | B | A | Inv. |
| 20 | | Y2 | M2 | C4 | K2 | 20 | 20 | B | B | A | Inv. |
| 21 | | Y2 | M2 | C2 | K4 | 20 | 20 | B | B | A | Inv. |
| 22 | Briefly | Y1 | M1 | C1 | K1 | 0 | 0 | D | D | D | Comp. |
| 23 | processed | Y2 | M2 | C2 | K2 | 0 | 0 | D | C | D | Comp. |
| 24 | OPP Film | Y3 | M3 | C3 | K3 | 0 | 0 | A | B | A | Inv. |
| 25 | having | Y4 | M4 | C4 | K4 | 0 | 0 | A | A | A | Inv. |
| 26 | surface | Y5 | M5 | C5 | K5 | 0 | 0 | A | B | A | Inv. |
| 27 | tension | Y5 | M3 | C3 | K3 | 0 | 0 | A | B | A | Inv. |
| 28 | value C | Y3 | M5 | C3 | K3 | 0 | 0 | A | B | A | Inv. |
| 29 | of | Y3 | M3 | C5 | K3 | 0 | 0 | A | B | A | Inv. |
| 30 | 52 mN/m | Y3 | M3 | C3 | K5 | 0 | 0 | A | B | A | Inv. |
| 31 | | Y4 | M3 | C3 | K3 | 10 | 10 | A | B | A | Inv. |
| 32 | | Y3 | M4 | C3 | K3 | 10 | 10 | A | B | A | Inv. |
| 33 | | Y3 | M3 | C4 | K3 | 10 | 10 | A | B | A | Inv. |
| 34 | | Y3 | M3 | C3 | K4 | 10 | 10 | A | B | A | Inv. |
| 35 | | Y2 | M4 | C4 | K4 | 20 | 20 | C | C | B | Inv. |
| 36 | | Y4 | M2 | C4 | K4 | 20 | 20 | C | C | B | Inv. |
| 37 | | Y4 | M4 | C2 | K4 | 20 | 20 | C | C | B | Inv. |
| 38 | | Y4 | M4 | C4 | K2 | 20 | 20 | C | C | B | Inv. |
| 39 | | Y4 | M2 | C2 | K2 | 20 | 20 | C | C | B | Inv. |
| 40 | | Y2 | M4 | C2 | K2 | 20 | 20 | C | C | B | Inv. |
| 41 | | Y2 | M2 | C4 | K2 | 20 | 20 | C | C | B | Inv. |
| 42 | | Y2 | M2 | C2 | K4 | 20 | 20 | C | C | B | Inv. |
| 43 | OPP Film | Y6 | M6 | C6 | K6 | 0 | 0 | B | D | D | Comp. |
| 44 | having | Y7 | M7 | C7 | K7 | 0 | 0 | B | B | B | Inv. |
| 45 | surface | Y8 | M8 | C8 | K8 | 0 | 0 | A | A | A | Inv. |
| 46 | tension | Y9 | M9 | C9 | K9 | 0 | 0 | A | A | A | Inv. |
| 47 | value C | Y10 | M10 | C10 | K10 | 0 | 0 | A | B | A | Inv. |
| 48 | of 47 mN/m | Y10 | M8 | C8 | K8 | 0 | 0 | A | B | A | Inv. |
| 49 | | Y8 | M10 | C8 | K8 | 0 | 0 | A | B | A | Inv. |
| 50 | | Y8 | M8 | C10 | K8 | 0 | 0 | A | B | A | Inv. |
| 51 | | Y8 | M8 | C8 | K10 | 0 | 0 | A | B | A | Inv. |

TABLE 5-continued

| Ink set No. | Recording medium | Ink Set Composition | | | | Maximum Value of Difference in Surface Tension among inks (mN/m) | | Result of Each Evaluation | | | Remarks |
| | | Y Ink | M Ink | C Ink | K Ink | Value A | Value B | Bleeding Resistance | Image Density Non-Uniformity Resistance | Smoothness | |
| --- | --- | --- | --- | --- | --- | --- | --- | --- | --- | --- | --- |
| 52 | | Y9 | M8 | C8 | K8 | 10 | 10 | A | A | A | Inv. |
| 53 | | Y8 | M9 | C8 | K8 | 10 | 10 | A | A | A | Inv. |
| 54 | | Y8 | M8 | C9 | K8 | 10 | 10 | A | A | A | Inv. |
| 55 | | Y8 | M8 | C8 | K9 | 10 | 10 | A | A | A | Inv. |
| 56 | | Y9 | M7 | C7 | K7 | 20 | 20 | A | B | A | Inv. |
| 57 | | Y7 | M9 | C7 | K7 | 20 | 20 | A | B | A | Inv. |
| 58 | | Y7 | M7 | C9 | K7 | 20 | 20 | A | B | A | Inv. |
| 59 | | Y7 | M7 | C7 | K9 | 20 | 20 | A | B | A | Inv. |
| 60 | Briefly | Y6 | M6 | C6 | K6 | 0 | 0 | B | D | D | Comp. |
| 61 | processed | Y7 | M7 | C7 | K7 | 0 | 0 | D | C | D | Comp. |
| 62 | OPP Film | Y8 | M8 | C8 | K8 | 0 | 0 | A | B | A | Inv. |
| 63 | having | Y9 | M9 | C9 | K9 | 0 | 0 | A | A | A | Inv. |
| 64 | surface | Y10 | M10 | C10 | K10 | 0 | 0 | A | B | A | Inv. |
| 65 | tension | Y10 | M8 | C8 | K8 | 0 | 0 | A | B | A | Inv. |
| 66 | value C | Y8 | M10 | C8 | K8 | 0 | 0 | A | B | A | Inv. |
| 67 | of | Y8 | M8 | C10 | K8 | 0 | 0 | A | B | A | Inv. |
| 68 | 52 mN/m | Y8 | M8 | C8 | K10 | 0 | 0 | A | B | A | Inv. |
| 69 | | Y9 | M8 | C8 | K8 | 10 | 10 | A | B | A | Inv. |
| 70 | | Y8 | M9 | C8 | K8 | 10 | 10 | A | B | A | Inv. |
| 71 | | Y8 | M8 | C9 | K8 | 10 | 10 | A | B | A | Inv. |
| 72 | | Y8 | M8 | C8 | K9 | 10 | 10 | A | B | A | Inv. |
| 73 | | Y9 | M7 | C7 | K7 | 20 | 20 | A | C | A | Inv. |
| 74 | | Y7 | M9 | C7 | K7 | 20 | 20 | A | C | A | Inv. |
| 75 | | Y7 | M7 | C9 | K7 | 20 | 20 | A | C | A | Inv. |
| 76 | | Y7 | M7 | C7 | K9 | 20 | 20 | A | C | A | Inv. |

Comp.; Comparative Example
Inv.; Present Invention

As can clearly be seen from Table 5, the ink jet recording method employing the inks of the present invention which satisfied the condition of A≦B is satisfied, wherein A represents surface tension of ink, while B represents surface tension of a cured ink resulted in better bleeding resistance, non-uniform image density resistance and smoothness of formed images compared to the comparative example.

Further as can clearly be seen from Table 5, the ink jet recording method employing the inks of the present invention which satisfied the condition that absolute value (|A−B|) of difference between value A (mN/m) of the surface tension of a recording medium and value B (mN/m) of the surface tension of ink cured by exposure to the aforesaid actinic radiation is 0–20 mN/m, resulted in better bleeding resistance, non-uniform image density resistance and smoothness of formed images compared to the comparative example.

Further, as the aforesaid effects, it was possible to confirm that bleeding resistance, non-uniform image density resistance and smoothness were further improved by employing an ink set in which maximum difference between value A and value B among inks, was at most 10 mN/m, when value B of the surface tension did not substantially change after 50 percent of exposure energy required for curing had been exposed.

According to the present invention, it is possible to provide an ink jet recording method which is capable of forming highly detailed images which exhibit excellent bleeding resistance, uniform density, and smoothness.

What is claimed is:

1. An ink jet recording method to form an image comprising the steps of:

(a) ejecting ink comprising an actinic radiation curable cationically polymerizable component from an ink jet recording head to deposit the ink on a non-ink absorptive recording medium; and (b) exposing the ink on the recording medium to an actinic radiation to cure the ink, wherein an absolute value of difference between a surface tension of the recording medium in mN/m and a surface tension of the ink after curing by exposing to the actinic radiation is 0 to 20 mN/m.

2. An ink jet recording method of claim 1 comprising further steps of after the step (b):

(c) ejecting a second ink comprising an actinic radiation curable cationically polymerizable component and having a different color than a color of the ink employed in step (a); and (d) exposing the second ink on the recording medium to an actinic radiation to cure the second ink, wherein absolute value of difference between the surface tension of the recording medium and a surface tension of at least one of the inks cured by exposing to the actinic radiation is 0 to 20 mN/m.

3. The ink jet recording method of claim 1, wherein a surface tension of the ink does not substantially vary after exposing 50 percent of radiation energy which is required to cure the ink.

4. The ink jet recording method of claim 1, wherein the steps (a) and (b) are repeated by employing a plurality of inks each having different color, and a maximum difference in surface tension among the inks cured by exposing to the actinic radiation is at most 10 mN/m.

5. The ink jet recording method of claim 1, wherein the steps (a) and (b) are repeated by employing a plurality of inks each having different color, and a maximum difference in surface tension among the inks before exposing is at most 10 mN/m.

6. The ink jet recording method of claim 1, wherein the condition of $A \leqq B$ is satisfied, wherein B is a surface tension of the ink cured by exposing to the actinic radiation in mN/m, and A is a surface tension in mN/m of the ink before exposing.

7. The ink jet recording method of claim 1, wherein the surface tension of the ink cured by exposing to the actinic radiation is 30 to 50 mN/m.

8. An ink jet recording method to form an image comprising the steps of:
   (a) ejecting ink comprising an actinic radiation curable cationically polymerizable component from an ink jet recording head to deposit the ink on a non-ink absorptive recording medium; and
   (b) exposing the ink on the recording medium to an actinic radiation to cure the ink,
   wherein an absolute value of difference between a surface tension of the recording medium in mN/m and a surface tension of the ink after curing by exposure to the actinic radiation is 0 to 20 mN/m, and
   the ink on the recording medium is exposed to an actinic radiation exhibiting the maximum illumination intensity of 0.1 to 50 mW/cm$^2$.

9. An ink jet recording method of claim 1, wherein the recording medium is a plastic film.

10. An ink jet recording method of claim 1, wherein volume of a liquid droplet of ink ejected from a nozzle of the ink jet recording head is 2–15 pl.

11. An ink jet recording method of claim 1, wherein the ink before ejection comprises an organic solvent in amount of 0.1–5 weight %.

12. An ink jet recording method of claim 11, wherein the ink before ejection comprises an organic solvent in amount of 0.1–3 weight %.

13. An ink jet recording method of claim 1, wherein the ink comprises an oxetane compound.

* * * * *